Dec. 10, 1968 SEIUEMON INABA ETAL 3,416,053

SWITCHING CIRCUIT FOR A PLURALITY OF MOTORS HAVING LOCKING MEANS

Filed March 18, 1966 6 Sheets-Sheet 1

SWITCHING CIRCUIT FOR A PLURALITY OF MOTORS HAVING LOCKING MEANS

Filed March 18, 1966

SWITCHING CIRCUIT FOR A PLURALITY OF MOTORS HAVING LOCKING MEANS

Filed March 18, 1966 6 Sheets-Sheet 6

United States Patent Office 3,416,053

Patented Dec. 10, 1968

3,416,053

SWITCHING CIRCUIT FOR A PLURALITY OF MOTORS HAVING LOCKING MEANS

Seiuemon Inaba, Norito Yoshitake, and Kengo Kobayashi, Kawasaki-shi, Japan, assignors to Fujitsu Limited, Kawasaki, Japan, a corporation of Japan Filed Mar. 18, 1966, Ser. No. 535,500
Claims priority, application Japan, Mar. 25, 1965, 40/17,368
2 Claims. (Cl. 318—103)

ABSTRACT OF THE DISCLOSURE

A pulse distributor coupled to a source of instructions provides a series of pulses in accordance with instructions and a control signal for operating one of a plurality of pulse motors. A plurality of ancillary pulse distributors connected to the pulse distributor distribute a series of pulses from the pulse distributor and provide pulses for driving corresponding ones of the motors. Gates are connected between the ancillary pulse distributors and a single amplifier connected in common to the motors. The gates selectively connect one of the ancillary pulse distributors to the single amplifier under the control of pulses from the pulse distributor. A plurality of locks each includes an electromagnet positioned in operative proximity with a corresponding one of the motors. A circuit supplies the control signal provided by the pulse distributor to the electromagnet of each lock to energize each such electromagnet. A plurality of relays connect a selected one of the motors to the single amplifier in accordance with signals from the pulse distributor and the others of the motors are maintained disconnected and locked in position.

*Description of the invention*

The present invention relates to a switching circuit. More particularly, the invention relates to a switching circuit for a plurality of motors.

In a control system utilizing a plurality of motors, each motor is provided with its own motor driving unit and its own amplifier. In many instances such as, for example, in a replica production system of the type disclosed in pending patent application Ser. No. 179,162, filed Mar. 12, 1962, now abandoned in which a replica of an object is produced in three dimensions, only one of the motors is operated at a time. This entails needless expense for a plurality of motor driving units and amplifiers which are idle much of the time.

The principal object of the present invention is to provide a new and improved switching circuit for a plurality of motors. The switching circuit of the present invention controls a plurality of motors via a single motor driving unit and a single amplifier and thereby is considerably more efficient and simple in structure and more economical in construction and operation than the known systems in which a plurality of motor driving units and a plurality of amplifiers are provided. The switching circuit of the present invention is efficient, simple in structure and economical in construction and operation, because it reduces considerably the equipment and components utilized.

In accordance with the present invention, a switching circuit for a plurality of motors comprises a plurality of locks each positioned in operative proximity with a corresponding one of the motors for maintaining the corresponding one of the motors locked in non-rotating position. A control for unlocking a selected one of the motors and for energizing the selected one of the motors for rotation comprises a single motor driving and amplifier unit, a switching arrangement selectively coupling the motor driving and amplifier unit to a selected one of the motors and a lock control in operative proximity with each of the locks for unlocking the selected one of the motors.

In order that the present invention may be readily carried into effect, it will now be described with reference to the accompanying drawings, wherein.

Figure 1:
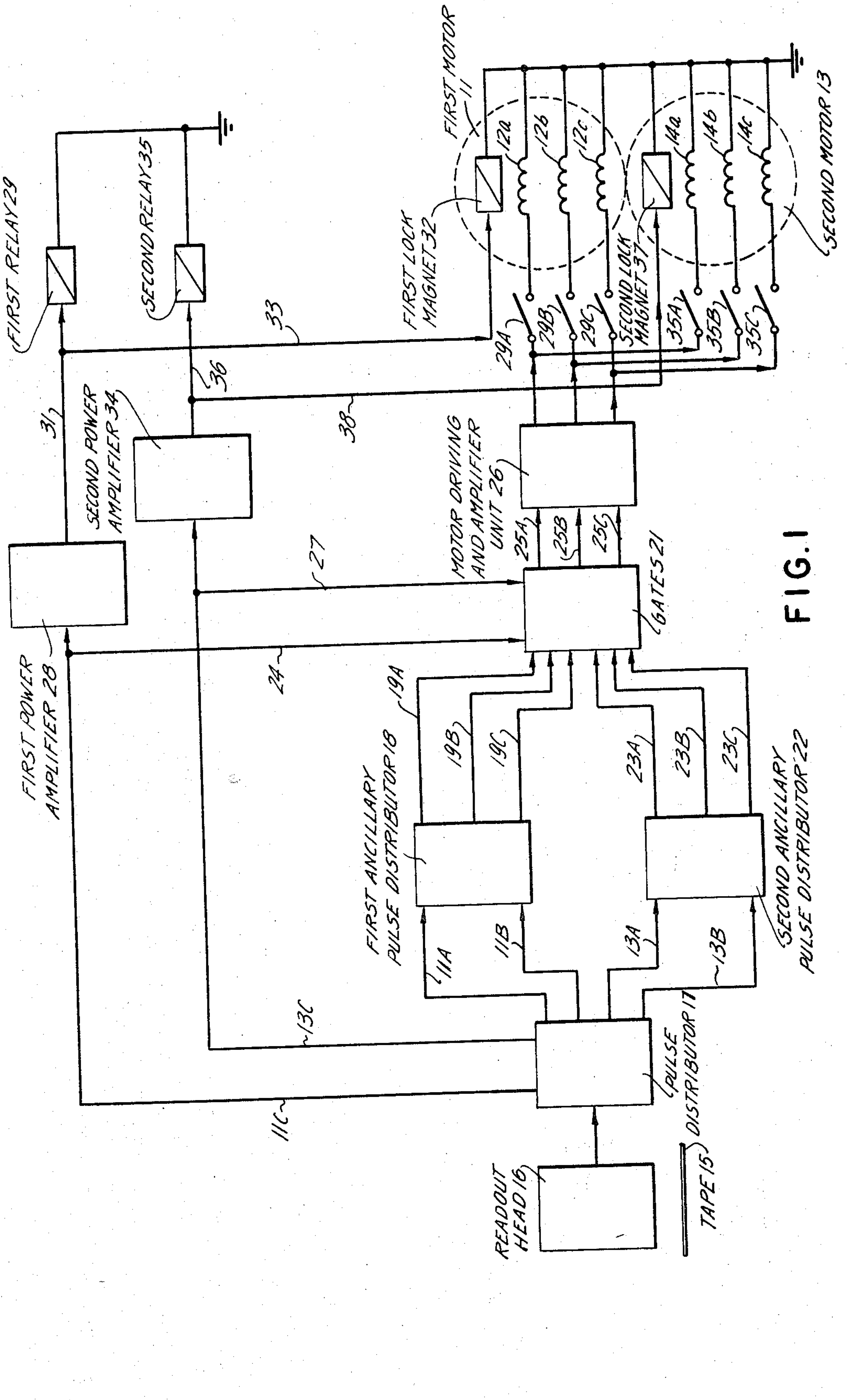
FIG. 1 is a block diagram of an embodiment of the switching circuit of the present invention for a plurality of motors.
Figures 2, 3, 4:
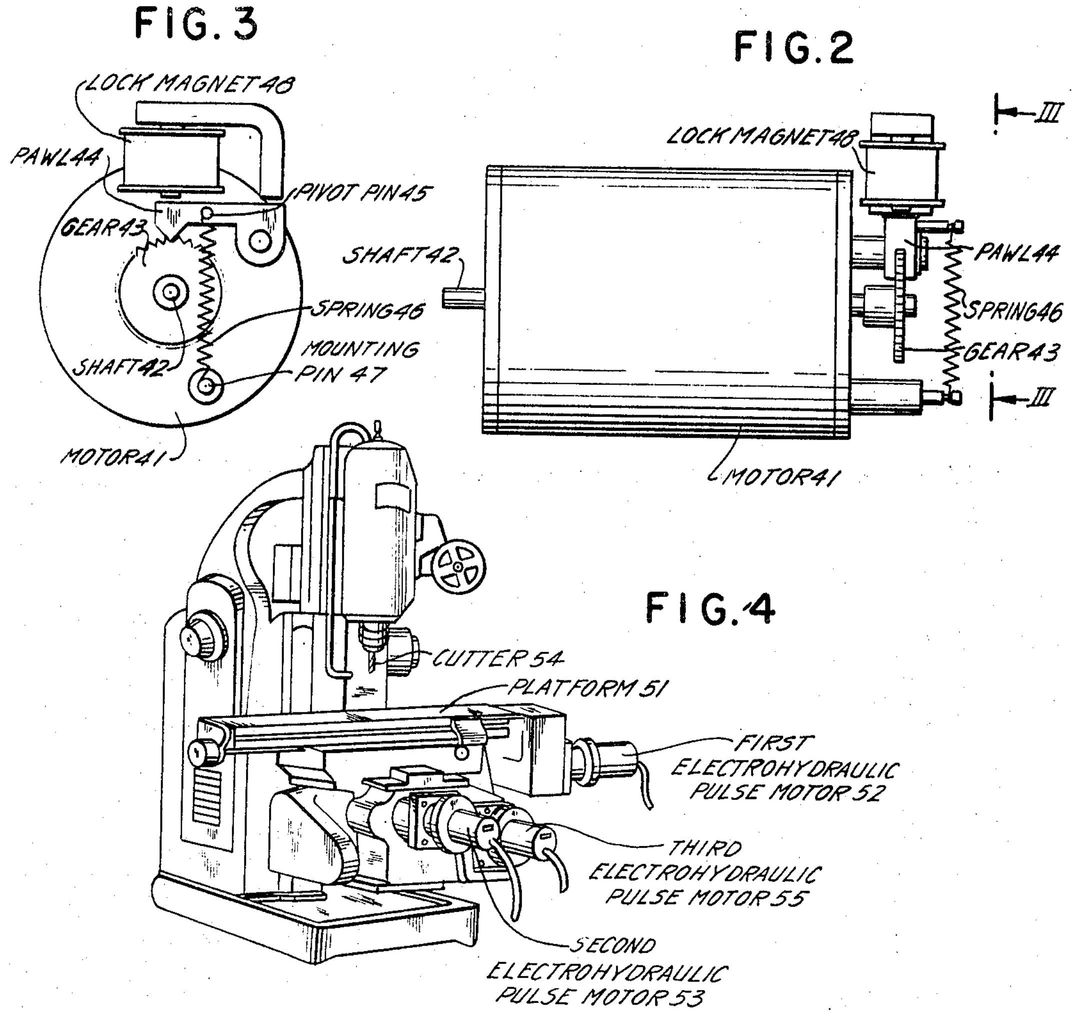
FIG. 2 is a side view of an embodiment of a motor lock which may be utilized with each of the motors controlled by the switching circuit of FIG. 1.
FIG. 3 is an end view, taken along the lines III—III of FIG. 2.
FIG. 4 is a perspective view of a milling machine utilizing three pulse motors.
Figure 5:
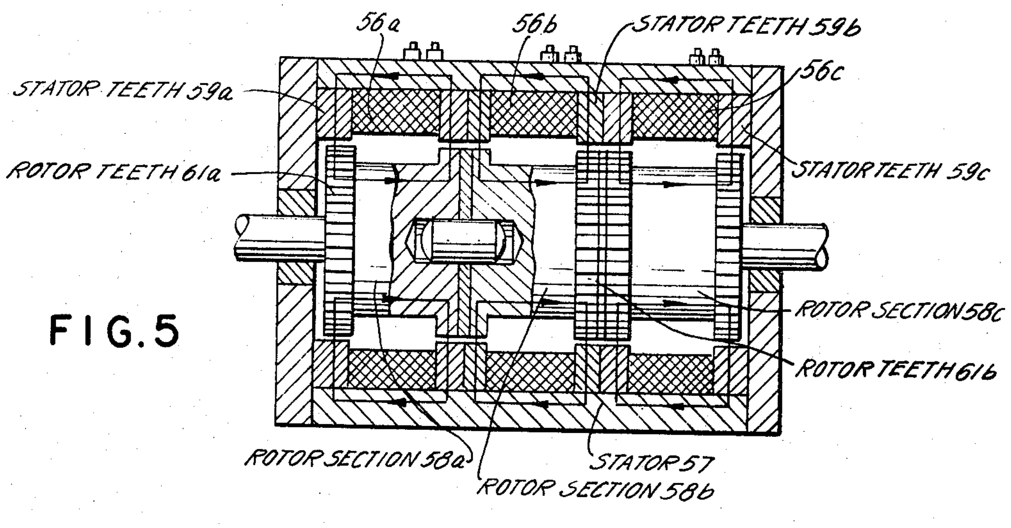
FIG. 5 is a view, partly in section, of an embodiment of a pulse motor which may be utilized as each of the first and second motors of FIG. 1.
Figures 6, 12:
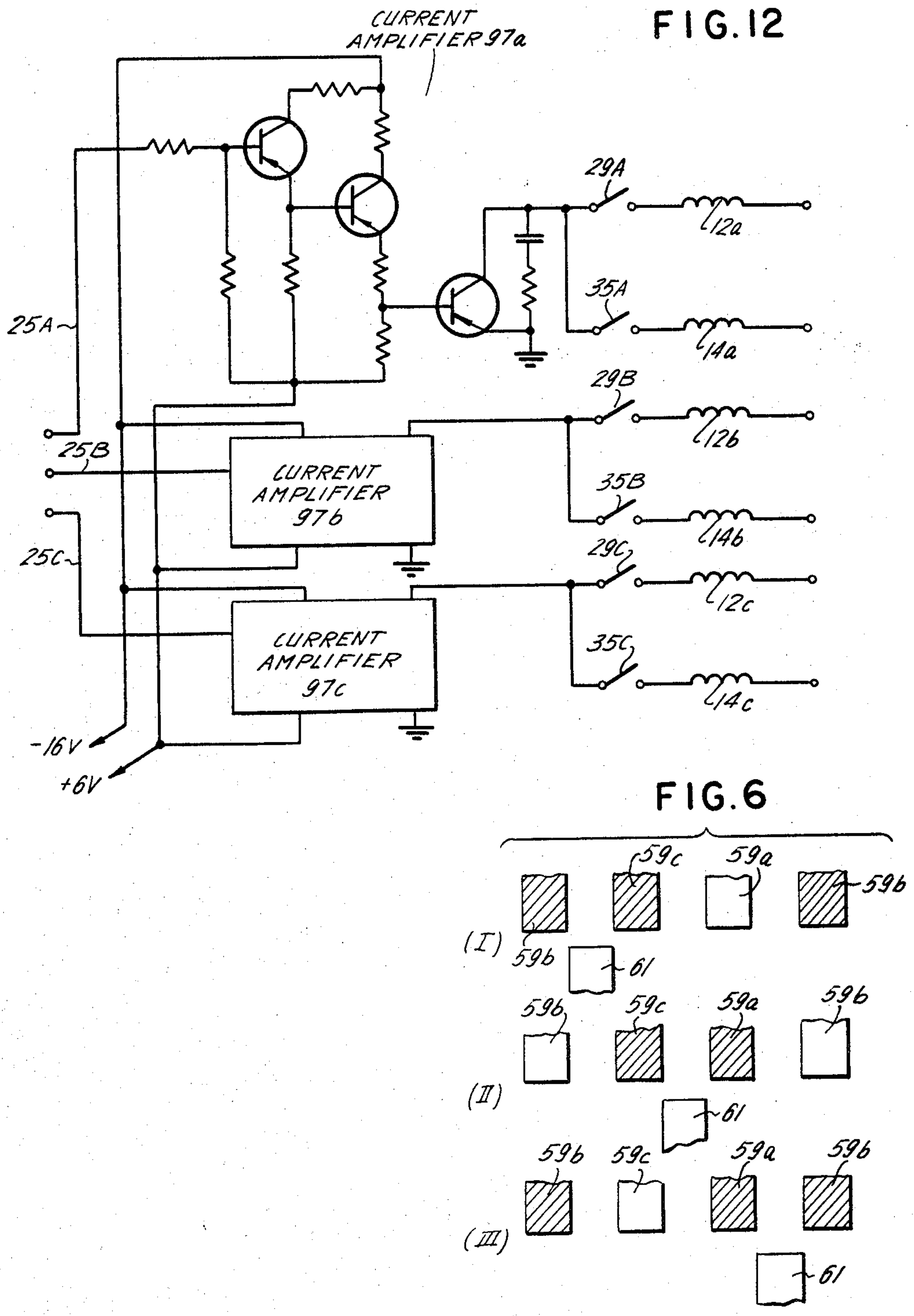
FIG. 6 is a schematic presentation of the positions of the teeth of the motor of FIG. 5.
FIG. 12 is a circuit diagram of an embodiment of a motor driving and amplifier unit which may be utilized as the motor driving and amplifier unit of FIG. 1.
Figure 7:
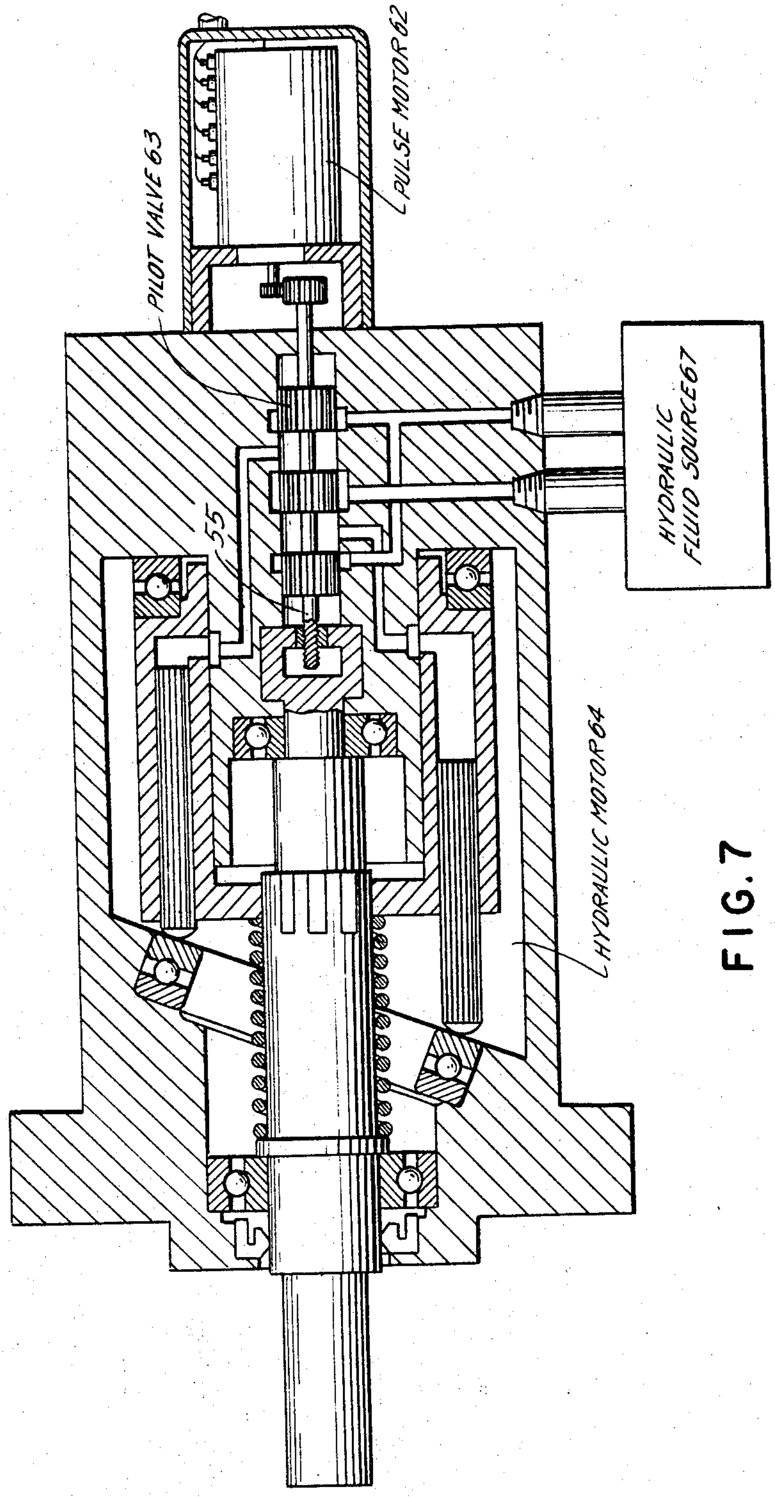
FIG. 7 is a view, partly in section, of an embodiment of an electrohydraulic pulse motor which may be utilized as each of the first and second motors of FIG. 1.

Although the switching circuit of the present invention is described herein for controlling two motors, three, four or more motors as utilized, for example in a milling machine of the type of FIG. 4, may be readily controlled by the appropriate modifications of the embodiment of FIG. 1. In FIG. 1, a first motor 11, having excitation windings 12*a*, 12*b* and 12*c*, and a second motor 13, having excitation windings 14*a*, 14*b* and 14*c*, are selectively switched into operation in accordance with suitable instructions recorded in a tape or other suitable storage medium 15. A known type of pulse motor is shown in FIG. 5 and the position of its rotor are illustrated in FIG. 6. A known type of electrohydraulic pulse motor is shown in FIG. 7. The first and second motors 11 and 13 may comprise either of these types of motor. The tape 15 may have the switching instructions recorded therein in any suitable manner such as, for example, by magnetization or by perforation. A suitable readout head 16 is positioned in operative proximity with the tape 15 and comprises any suitable readout means for reading out the instructions recorded in said tape.

Figure 8:
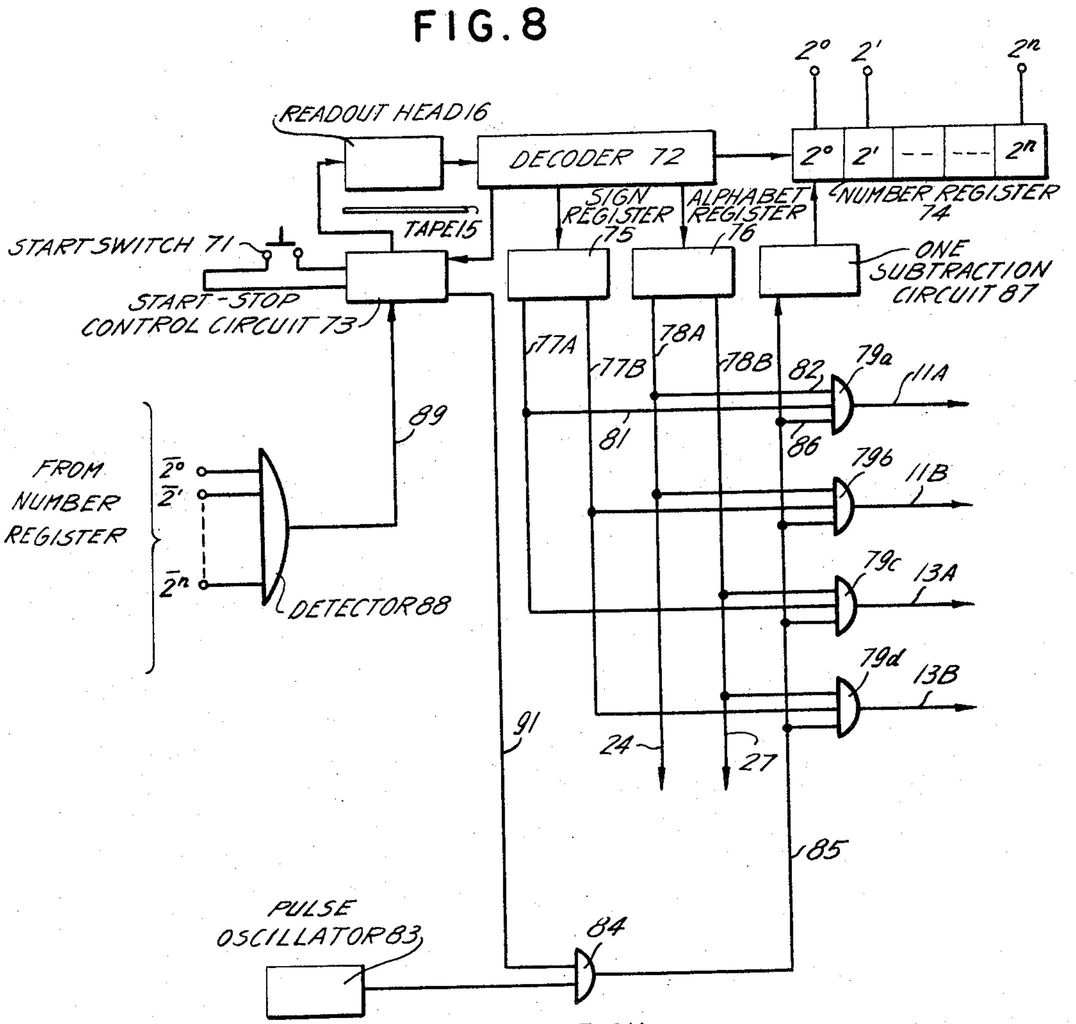
FIG. 8 is a block diagram of an embodiment of a pulse distributor which may be utilized as the pulse distributor of FIG. 1.

The readout head 16 is connected to a pulse distributor 17 and supplies the switching instructions to said distributor. The distributor 17 is of known type and operates in a known manner to transmit a series of pulses to a selected one of its four outputs 11A, 11B, 13A and 13B and to transmit a control signal to the corresponding one of its two outputs 11C and 13C. A suitable pulse distributor which may be utilized as the pulse distributor 17 is shown in FIG. 8. Thus, if the instructions recorded in the tape 15 are to operate the first motor 11 to rotate in a forward direction, a series of pulses is provided in the output 11A and a control pulse is provided in the output 11C. If the instructions recorded in the tape 15 are to operate the first motor 11 to rotate in a reverse direction, a series of pulses is provided in the output 11B and a control pulse is provided in the output 11C. If the instructions recorded in the tape 15 are to operate the second motor 13 to rotate in a forward direction, a series of pulses is provided in the output 13A and a control pulse is provided in the output 13C. If the instructions recorded in the tape 15 are to operate the second motor 13 to rotate in a reverse direction, a series of pulses is provided in the output 13B and a control pulse is provided in the output 13C.

Figure 10:
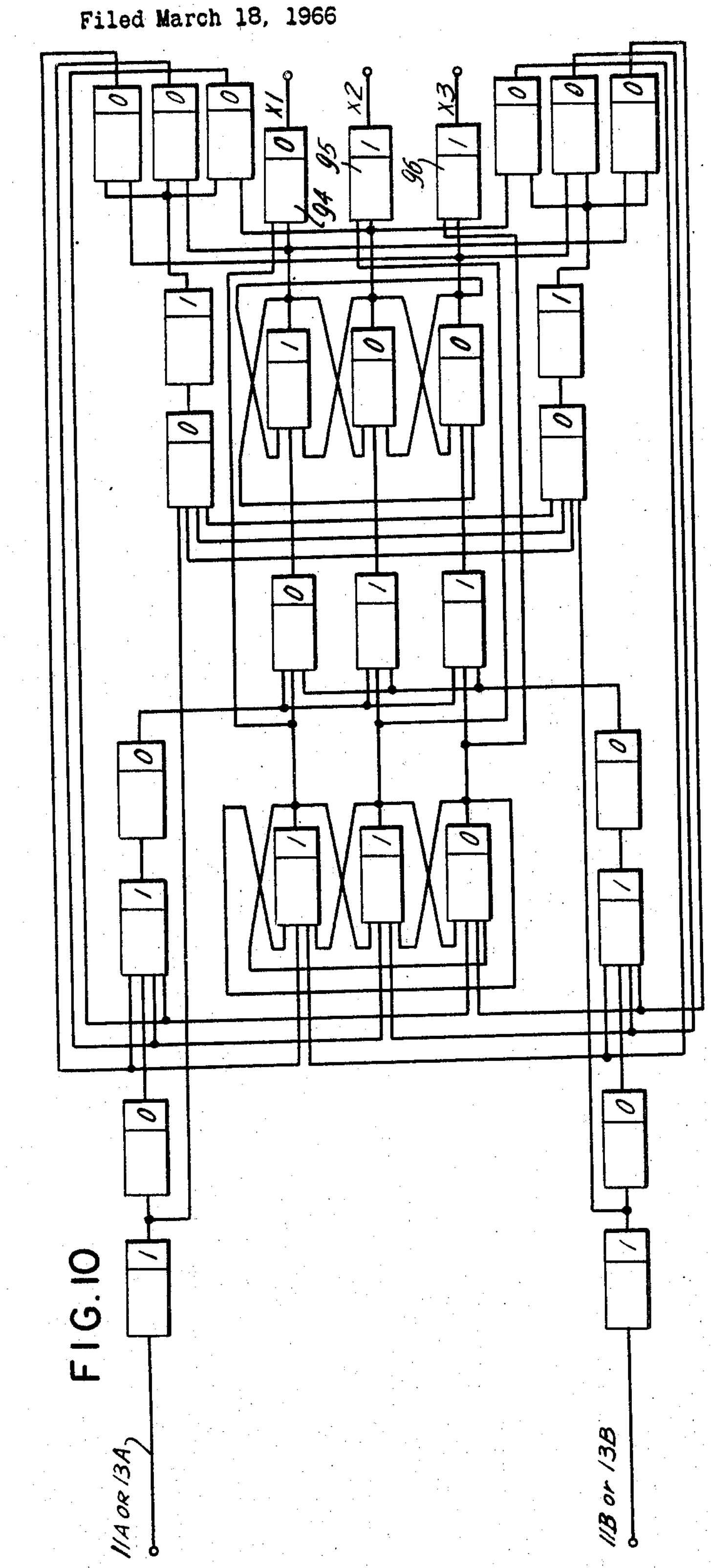
FIG. 10 is a block diagram of an embodiment of an ancillary pulse distributor which may be utilized as each of the first and second ancillary pulse distributors of FIG. 1.

The outputs 11A and 11B are connected to a first ancillary pulse distributor 18. The first ancillary distributor 18 is of known type and operates in a known manner to provide signals in its three outputs to properly energize or operate the first motor 11 in accordance with the series of pulses supplied via the output 11A or the output 11B of the pulse distributor 17. The signals for energizing the first motor 11 are provided in the outputs 19A, 19B and 19C of the first ancillary distributor 18 and are supplied to a plurality of gates 21 via such outputs. The outputs 13A and 13B are connected to a second ancillary pulse distributor 22. The second ancillary distributor 22 is of the same type as the first ancillary distributor 18 and operates in known manner to provide signals in its three outputs to properly energize or operate the second motor 13 in accordance with the series of pulses supplied via the output 13A or the output 13B of the pulse distributor 17. A suitable ancillary pulse distributor which may be utilized as each of the first and second ancillary pulse distributors 18 and 22 is shown in FIG. 10. The signals for energizing the second motor 13 are provided in the outputs 23A, 23B and 23C of the second ancillary distributor 22 and are supplied to the gates 21 via such outputs.

The gates 21 comprise any suitable known logical circuitry which is switched by the control signal in the output 11C or by the control signal in the output 13C. The control signal in the output 11C switches the gates 21 via a lead 24 to transfer the signals provided in the outputs 19A, 19B and 19C to leads 25A, 25B and 25C which are connected to the inputs of a motor driving and amplifier unit 26. The control signal in the output 13C switches the gates 21 via a lead 27 to transfer the signals provided in the outputs 23A, 23B and 23C to the leads 25A, 25B and 25C and via said leads to the motor driving and amplifier unit 26.

The control signal in the output 11C is amplified in a first power amplifier 28 and the amplified control signal is supplied to a first relay 29 via a lead 31 and to a first lock magnet 32 via a lead 33. The control signal in the output 13C is amplified in a second power amplifier 34 and the amplified control signal is supplied to a second relay 35 via a lead 36 and to a second lock magnet 37 via a lead 38. The first relay 29 is energized by the amplified control signal in the lead 31 and the first lock magnet 32 is energized by the amplified control signal in the lead 33. The second relay 35 is energized by the amplified control signal in the lead 36 and the second lock magnet 37 is energized by the amplified control signal in the lead 38.

When the first lock magnet 32 is energized, it releases the lock on the first motor 11 in a manner described with reference to FIGS. 2 and 3 and when the second lock magnet 37 is energized, it releases the lock on the second motor 13 in the same manner. When the first relay 29 is energized, it closes relay armatures 29A, 29B and 29C, operated thereby, to close the energizing circuits from the motor driving and amplifier unit 26 to the excitation windings 12*a*, 12*b* and 12*c* of the first motor 11. When the second relay 35 is energized, it closes relay armatures 35A, 35B and 35C, operated thereby, to close the energizing circuits from the motor driving and amplifier unit 26 to the excitation windings 14*a*, 14*b* and 14*c* of the second motor 13.

The motor driving and amplifier unit 26 comprises a known single motor driving unit and a known single amplifier and provides in a known manner sufficient electrical energy to rotate either the first or the second motor in either the forward or the reverse direction. A suitable motor driving and amplifier unit which may be utilized as the motor driving and amplifier unit 26 is illustrated in FIG. 12. Thus, when the instructions in the tape 15 are to rotate the first motor 11 in the forward direction, for example, a series of pulses is provided in the output 11A of the pulse distributor 17, energizing signals are provided in the outputs 19A, 19B and 19C of the first ancillary pulse distributor 18 and such energizing signals are transferred through the gates 21 to the motor driving and amplifier unit 26 under the control of the control signal in the output 11C of said pulse distributor. The control signal in the output 11C of the pulse distributor 17 energizes the first relay 29, which when energized closes its armatures 29A, 29B and 29C, so that the excitation windings 12*a*, 12*b* and 12*c* of the first motor 11 are energized by the electrical energy from the motor driving and amplifier unit 26. At the same time, the control signal in the output 11C of the pulse distributor 17 energizes the first lock magnet 32, which when energized releases the lock on the first motor 11, as hereinafter described, and frees said motor for rotation in the forward direction. The second motor 13 remains locked in non-rotating position.

When the instructions in the tape 15 are to rotate the second motor 13 in the reverse direction, for example, a series of pulses is provided in the output 13B of the pulse distributor 17, energizing signals are provided in the outputs 23A, 23B and 23C of the second ancillary pulse distributor 22 and such energizing signals are transferred through the gates 21 to the motor driving and amplifier unit 26 under the control of the control signal in the output 13C of said pulse distributor. The control signal in the output 13C of the pulse distributor 17 energizes the second relay 35, which when energized closes its armatures 35A, 35B and 35C, so that the excitation windings 14*a*, 14*b* and 14*c* of the second motor 13 are energized by the electrical energy from the motor driving and amplifier unit 26. At the same time, the control signal in the output 13C of the pulse distributor 17 energizes the second lock magnet 37, which when energized releases the lock on the second motor 13, as hereinafter described, and frees said motor for rotation in the reverse direction. The first motor 11 remains locked in non-rotating position.

In order to prevent the shifting of either of the first and second motors 11 and 13 from the position at which they are stopped, the components of the first and second ancillary pulse distributors 18 and 22 remain in the conditions they are in when at which the corresponding motor stops, so that it may start from such position the next time it is operated.

Each of the first and second motors 11 and 13 may comprise a three phase pulse driven step motor having a lock as shown in FIGS. 2 and 3. In FIGS. 2 and 3, a motor 41, which may comprise the first motor 11, the second motor 13 or any other motor controlled by the switching circuit f the present invention, rotates, when energized by shaft 42. A gear or toothed wheel 43 is affixed to the shaft 42 and rotates therewith. The gear 43 has a number of teeth on its peripheral surface equal to the number of pulses required to turn the motor 41 one revolution.

A pawl, catch, click or detent 44 is pivotally mounted on a pivot pin 45 supported by the housing of the motor 41. The pawl 44 engages the teeth of the gear 43 and is continually urged toward the axis of said gear by a spring 46 which is affixed at one end to said pawl and at the other end to a mounting pin 47 supported by the housing of the motor 41. The spring 46 thus maintains the motor 41 locked in a non-rotating position by maintaining the pawl 44 in locking engagement with the teeth of the gear 43.

A lock magnet 48 is suitably mounted on the housing of the motor 41 and may comprise each of the first and second lock magnets 32 and 37 or any other lock magnet included in the switching circuit of the present invention. The lock magnet 48 is positioned in operative proximity with the pawl 44, so that when said lock magnet, which is an electromagnet, of course, is energized, it attracts said pawl against the force of the spring 46 to disengage said pawl from the teeth of the gear 43 and thereby release the lock and free the motor 41 for rotation. When the lock magnet 48 is deenergized it does not affect the lock and the pawl 44 and spring 46 maintain the motor 41 locked in non-rotating position.

FIG. 4 shows a milling machine utilizing three motors to position a workpiece supporting platform. In FIG. 4, a workpiece (not shown) is supported on a platform 51. The platform 51, and thus the workpiece, is moved in a direction along the X axis by a first electrohydraulic pulse motor 52 which may comprise the first motor 11 of FIG. 1. The platform 51 is moved in a direction along the Y axis by a second electrohydraulic pulse motor 53 which may comprise the second motor 13 of FIG. 1. The first and second motors 52 and 53 may then be controlled by the switching circuit of the present invention in order to position the workpiece as instructed relative to a cutter 54. A third electrohydraulic pulse motor 55, which moves the platform 51 in the direction of the Z axis, may also be controlled by the switching circuit of the present invention.

FIG. 5 shows a pulse motor which may be utilized as each of the first motor 11 and the second motor 13 of FIG. 1. The first, second and third excitation windings **56*a*, 56*b* and 56*c* may be the first, second and third excitation windings 12*a*, 12*b* and 12*c* of the first motor 11 of FIG. 1 or the first, second and third excitation windings 14*a*, 14*b* and 14*c* of the second motor 13. A motor of the type of FIG. 5 is disclosed in United States Patent No. 3,293,460, issued Dec. 20, 1966. The motor of FIG. 5 comprises a stator 57, which comprises the excitation windings 56*a*, 56*b* and 56*c*, and three coaxially mounted rotor sections 58*a*, 58*b* and 58*c*. The stator 57 comprises three sets of teeth 59*a*, 59*b* and 59*c* and each of the rotor sections has teeth; the rotor section 58*a* having teeth 61*a*, the rotor section 58*b* having teeth 61*b* and the rotor section 58*c* having teeth 61*c***.

Since the rotor teeth **61*a*, 61*b* and 61*c* are in alignment in directions parallel to the axis of the motor, they are indicated as a single set of rotor teeth 61 in FIG. 6. In the first view I of FIG. 6, the excitation windings 56*b* and 56*c* are energized or excited, and the rotor teeth 61 are positioned between the stator teeth 59*b* and 59*c*. In the second view II or FIG. 6, the excitation windings 56*c* and 56*a* are energized, and the rotor teeth 61 are positioned betwen the stator teeth 59*c* and 59*a*. In the third view III of FIG. 6, the excitation windings 56*a* and 56*b* are energized, and the rotor teeth 61 are positioned between the stator teeth 59*a* and 59*b***.

FIG. 7 illustrates an electrohydraulic pulse motor which may be utilized as each of the first motor 11 and the second motor 13 of FIG. 1. A motor of the type of FIG. 7 is disclosed in pending patent application Ser. No. 179,162, filed Mar. 12, 1962. The electrohydraulic pulse motor comprises a pulse motor 62, a pilot valve 63 and a hydraulic motor 64. When the pulse motor 62 rotates through a determined angle, the pilot valve 63 is moved in an axial direction due to the threaded members 65 and 66. The movement of the pilot valve 63 in an axial direction permits hydraulic fluid under pressure to flow from a hydraulic fluid source 67 to the hydraulic motor 64. When the hydraulic motor 64 has rotated through the same angle as the pilot valve 63, said pilot valve is returned to its initial position, as shown in FIG. 7.

FIG. 8 illustrates a pulse distributor which may be utilized as the pulse distributor 17 of FIG. 1. When a start switch 71 is closed, the digit or number, sign and letter or alphabet data stored in the tape 15 is read out by the readout head 16 and is decoded by a decoder 72 under the control of a start-stop control circuit 73. The decoded data provided by the decoder 72 is submitted as number data to a number register 74, as sign data to a sign register 75 and as letter or alphabet data to an alphabet register 76.

When the platform or other movable part of a machine is to be moved a determined distance in a positive direction along the X axis, for example, the sign register 75 provides a signal at its positive output 77A and the alphabet register provides a signal at its X axis output 78A. The positive output 77A and the X axis output 78A are connected to inputs of an AND gate **79*a* via leads 81 and 82, respectively. A feed pulse produced by a pulse oscillator 83 is transferred by an AND gate 84 under the control of the start-stop control circuit 73 and is supplied to the AND gate 79*a* via leads 85 and 86. The AND gate 79*a* is thus made conductive and transfers a positive X axis direction signal in the output 11A. At the same time, the feed pulse is supplied to a one subtraction circuit 87 and said one substraction circuit substracts a one from the number register 74 each time a pulse is received. When the content of the number register 74 is reduced to zero, a detector 88, connected to said number register, as indicated, is operated. When the detector 88 is operated, it signals the start-stop control circuit 73 via a lead 89, and said control circuit 73 then switches the AND gate 84 to its non-conductive condition via a lead 91 so that the feed pulse is no longer transferred. The sign register 75 has a negative output 77B and the alphabet register 76 has a Y axis output 78B**.

Figure 9:
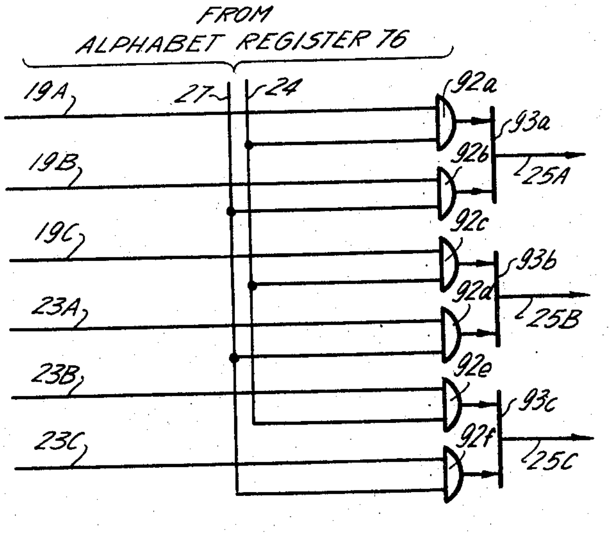
FIG. 9 is a block diagram of an embodiment of gates which may be utilized as the gates of FIG. 1.

FIG. 9 shows gates which may be utilized as the gates 21 of FIG. 1. A plurality of gates **92*a*, 92*b*, 92*c*, 92*d*, 92*e* and 92*f* are each controlled by the control signal in the output 11C or by the control signal in the output 13C of the pulse distributor 17 (FIG. 1) which outputs are the same as the X axis output 78A and the Y axis output 78B of the alphabet register 76 and which are supplied to the gates via the leads 24 and 27 (FIG. 1). The outputs of the AND gates are supplied in pairs to the leads 25A, 25B and 25C (FIG. 1) via OR gates 93*a*, 93*b* and 93*c***.

FIG. 10 illustrates an ancillary pulse distributor which may be utilized as each of the first and second ancillary pulse distributors 18 and 22 of FIG. 1. The ancillary pulse distributor comprises a plurality of NOR circuits. When a pulse is supplied from the output 11A or 13A of the pulse distributor 17 (FIG. 1), the condition of NOR elements 94, 95 and 96 varies as shown in Table I. When a pulse is supplied from the output 11B or 13B of the pulse distributor 17 (FIG. 1), the condition of the NOR elements 94, 95 and 96 varies in reverse from the tabular presentation of Table I.

TABLE I

| Pulse Number | NOR Circuits | | |
|---|---|---|---|
| | 94 | 95 | 96 |
| Condition 1 | 1 | 0 | 1 |
| Condition 2 | 1 | 1 | 0 |
| Condition 3 | 0 | 1 | 1 |
| Condition 4 | 1 | 0 | 1 |

Figure 11:
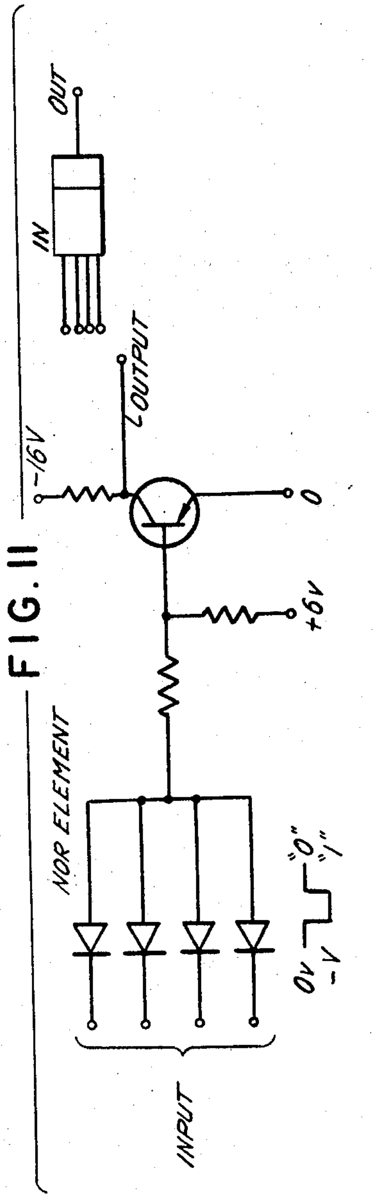
FIG. 11 is a circuit diagram of an embodiment of a NOR circuit which may be utilized as each of the NOR circuits of FIG. 10.

FIG. 11 illustrates a NOR circuit which may be utilized as each of the NOR circuits of FIG. 10.

FIG. 12 shows a motor driving and amplifier unit which may be utilized as the motor driving and amplifier unit 26 of FIG. 1. The unit 26 comprises three amplifiers **97*a*, 97*b* and 97*c*, which operate as current amplifiers. The lead 25A (FIG. 1) is connected to the input of the amplifier 97*a*, the lead 25B is connected to the input of the amplifier 97*b* and the lead 25C is connected to the input of the amplifier 97*c*. When a negative potential is applied to one of the leads 25A, 25B and 25C, so that its conducts a "1" signal, the amplifier 97***a*, 97*b* or 97*c*, to which said one of leads is connected, is made operative. If the armatures 29A, 29B and 29C are closed, the corresponding excitation winding 12*a*, 12*b* or 12*c* is energized. If the armatures 35A, 35B and 35C are closed, the corresponding excitation winding 14*a*, 14*b* or 14c is energized.

While the invention has been described by means of a specific example and in a specific embodiment, we do not wish to be limited thereto, for obvious modifications will occur to those skilled in the art without departing from the spirit and scope of the invention.

We claim:

1. A switching circuit for a plurality of pulse motors, comprising a source of instructions;

pulse distributor means coupled to said source of instructions for providing a series of pulses in accordance with instruction and for providing a control signal for operating one of said pulse motors;

a plurality of ancillary pulse distributor means connected to said pulse distributor means for distributing a series of pulses from said pulse distributor means and for providing pulses for driving corresponding ones of said pulse motors;

a single amplifier connected in common to said pulse motors;

gate means connected between said ancillary pulse distributor means and said single amplifier for selectively connecting one of said ancillary pulse distributor means to said single amplifier under the control of pulses from said pulse distributor means;

a plurality of locking means each including an electromagnet positioned in operative proximity with a corresponding one of said pulse motors;

circuit means for supplying the control signal provided by said pulse distributor means to the electromagnet of each of said locking means to energize each said electromagnet;

relay-controlled switch means interposed between said single amplifier and each of said pulse motors; and a plurality of relays connected to said pulse distributor means each controlling the relay-controlled switch means of a corresponding one of said pulse motors and energized by signals provided by said pulse distributor means whereby a selected one of said pulse motors is connected via said relay-controlled switch means to said single amplifier in accordance with signals from said pulse distribution means and the others of said pulse motors are maintained disconnected and locked in position.

2. A switching circuit as claimed in claim 1, wherein each of said locking means comprises a toothed wheel mounted with the corresponding one of said motors for rotation therewith, a pawl pivotally mounted for engagement with the teeth of said toothed wheel and spring means affixed to said pawl for continually urging said pawl into engagement with the teeth of said toothed wheel thereby preventing rotation of said corresponding one of said motors.

References Cited

UNITED STATES PATENTS

| | | | |
|---|---|---|---|
| 1,063,377 | 6/1913 | Norwood | 318—103 X |
| 2,317,344 | 4/1943 | Hood | 188—171 X |
| 2,938,606 | 5/1960 | Passman | 188—171 X |
| 2,941,638 | 6/1960 | Hoover | 318—103 X |
| 3,045,884 | 7/1962 | Buhrendorf | 318—103 X |

ORIS L. RADER, *Primary Examiner.*

B. A. COOPER, *Assistant Examiner.*

U.S. Cl. X.R.

188—171